(12) United States Patent
Aguiar, Jr. et al.

(10) Patent No.: US 11,984,838 B2
(45) Date of Patent: May 14, 2024

(54) DIRECT CURRENT LOAD IDENTIFICATION SYSTEM

(71) Applicant: Haier US Appliance Solutions, Inc., Wilmington, DE (US)

(72) Inventors: Ricardo Alberto Aguiar, Jr., Clarksville, IN (US); Maria Alejandra Contreras, Jeffersonville, IN (US); Timothy David Kaiser, Louisville, KY (US); Brett Alan Farris, Louisville, KY (US)

(73) Assignee: Haier US Appliance Solutions, Inc.

( * ) Notice: Subject to any disclaimer, the term of this patent is extended or adjusted under 35 U.S.C. 154(b) by 91 days.

(21) Appl. No.: 17/377,966

(22) Filed: Jul. 16, 2021

(65) Prior Publication Data

US 2023/0015422 A1    Jan. 19, 2023

(51) Int. Cl.
| | |
|---|---|
| H02P 7/34 | (2016.01) |
| A47L 15/42 | (2006.01) |
| A47L 15/46 | (2006.01) |
| G05B 19/042 | (2006.01) |

(52) U.S. Cl.
CPC ............ *H02P 7/34* (2013.01); *A47L 15/4225* (2013.01); *A47L 15/46* (2013.01); *G05B 19/042* (2013.01); *A47L 15/4274* (2013.01)

(58) Field of Classification Search
CPC ........ H02P 7/34; A47L 15/4225; A47L 15/46; A47L 15/4274; G05B 19/042
See application file for complete search history.

(56) References Cited

U.S. PATENT DOCUMENTS

| | | | |
|---|---|---|---|
| 7,064,517 B2 | 6/2006 | Kiuchi | |
| 10,945,582 B1 | 3/2021 | Farris | |
| 2006/0290312 A1* | 12/2006 | Nagai | H02P 6/182 |
| | | | 318/599 |
| 2007/0229050 A1* | 10/2007 | Shigeta | H03K 17/0822 |
| | | | 323/282 |
| 2008/0265829 A1* | 10/2008 | Hayashi | H02P 21/18 |
| | | | 318/801 |
| 2016/0156292 A1* | 6/2016 | Nakao | H02K 5/22 |
| | | | 318/400.27 |
| 2021/0164698 A1* | 6/2021 | Ohtsuka | F25B 49/022 |
| 2022/0399174 A1* | 12/2022 | Telefus | G01R 31/3277 |
| 2023/0118691 A1* | 4/2023 | Morimoto | H02K 11/30 |
| | | | 310/71 |

FOREIGN PATENT DOCUMENTS

| | | |
|---|---|---|
| CN | 100338867 C | 9/2007 |
| DE | 102013226828 A1 | 6/2015 |
| EP | 2567246 A1 | 3/2013 |

* cited by examiner

*Primary Examiner* — Zoheb S Imtiaz
(74) *Attorney, Agent, or Firm* — Dority & Manning, P.A.

(57) ABSTRACT

An appliance, as provided herein, can include a direct current load and a current sensing circuit that can be coupled to the direct current load. The current sensing circuit can be configured to collect electrical data corresponding to the direct current load. The appliance can include one or more processors that can be coupled to the current sensing circuit. The one or more processors can be configured to identify at least one attribute of the direct current load based, at least in part, on the electrical data and activate at least one operation of the direct current load or the appliance based, at least in part, on identification of the at least one attribute of the direct current load.

15 Claims, 9 Drawing Sheets

DIRECT CURRENT LOAD IDENTIFICATION SYSTEM

FIELD

The present subject matter relates generally to appliances, and more particularly, to identification of a direct current load coupled to an appliance.

BACKGROUND

Appliances, such as dishwasher appliances, refrigerator appliances, oven appliances, microwave appliances, washing machine appliances, dryer appliances, and/or other appliances generally include one or more components that direct operation of a given appliance. Specifically, an appliance can include a controller (also referred to as a "control board") having a printed circuit board, one or more processors, and memory. The controller is generally connected to a control pad and/or a control panel. Through programmed instructions and input from the control pad and/or control panel, the controller can work with other components of the appliance to direct operations thereof.

The controller of a given model of an appliance such as, for example, a dishwasher appliance, is generally programmed with a specific personality (e.g., relating to motor operation, heater operation, user interface operation, etc.) that is tailored to that same model of dishwasher appliance. However, a single type of controller is often used in multiple unique models of a certain dishwasher appliance. While some components or features are common to different models of a certain dishwashing appliance, many components and/or features can vary between different models (e.g., fan type and/or speed, dispenser cup type, rinse aide type, quantity of buttons and/or light emitting diodes (LEDs), etc.). The operation and/or functionality of one or more common components (e.g., a motor, a pump, etc.) included in multiple different models of a given dishwasher appliance can be affected by the presence and/or operation of the varied components. As such, the single type of controller used in multiple unique models of a certain dishwasher appliance can include multiple different personalities (e.g., discrete personalities that respectively correspond to different models of dishwasher appliances). During installation of the controller, the installer or manufacturer will generally select a specific personality corresponding to the model of the dishwasher appliance into which the controller is being installed.

A problem with using a single type of controller having multiple different personalities stored thereon is that, collectively, the various personalities consume significant memory and/or surface area on the controller. Another problem with using a single type of controller having multiple different personalities stored thereon is that it complicates the manufacturing and/or assembly process and involves manual selections performed by the installer or manufacturer. For example, such manual selections of a personality can be time-consuming, difficult, and/or expensive. Furthermore, if the installer chooses the wrong personality setting, the dishwasher appliance may fail to operate as intended.

BRIEF DESCRIPTION

Aspects and advantages of the present disclosure will be set forth in part in the following description, or may be obvious from the description, or may be learned through practice of the present disclosure.

In one example aspect of the present disclosure, an appliance is provided. The appliance can include a direct current load and a current sensing circuit that can be coupled to the direct current load. The current sensing circuit can be configured to collect electrical data corresponding to the direct current load. The appliance can include one or more processors that can be coupled to the current sensing circuit. The one or more processors can be configured to identify at least one attribute of the direct current load based, at least in part, on the electrical data and activate at least one operation of the direct current load or the appliance based, at least in part, on identification of the at least one attribute of the direct current load.

In another example aspect of the present disclosure, a method of operating an appliance is provided. The method can include obtaining, by one or more processors, from a current sensing circuit of the appliance, electrical data corresponding to a direct current load of the appliance. The method can further include identifying, by the one or more processors, at least one attribute of the direct current load based, at least in part, on the electrical data. The method can also include activating, by the one or more processors, at least one operation of the direct current load or the appliance based, at least in part, on identification of the at least one attribute of the direct current load.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present specification including the best mode thereof, directed to one of ordinary skill in the art, is set forth in the specification, which makes reference to the appended figures.

Figure 1:
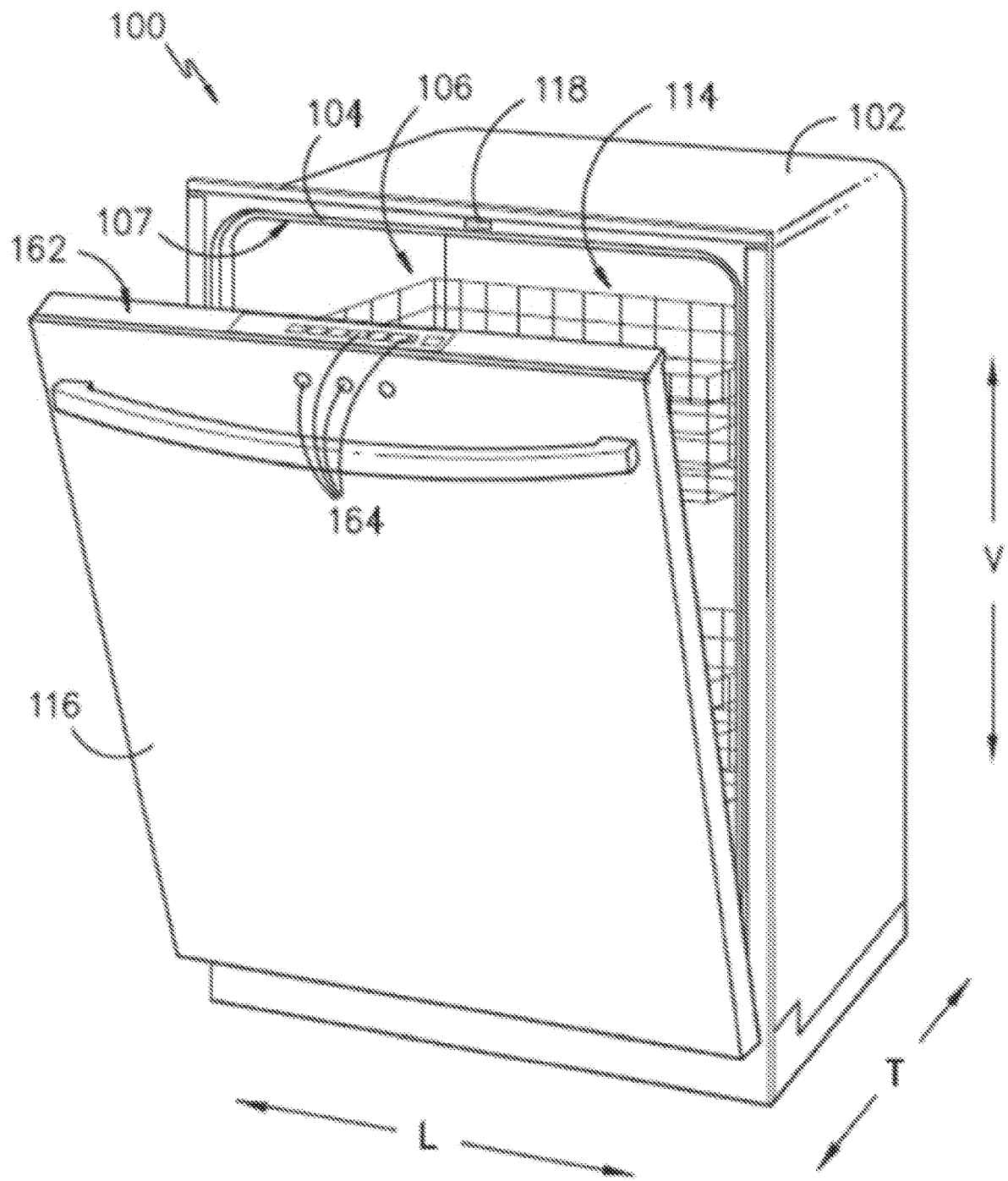
FIG. 1 illustrates a perspective view of an example, non-limiting appliance that can facilitate direct current load sensing in accordance with one or more embodiments of the present disclosure.

Repeat use of reference characters in the present specification and accompanying drawings is intended to represent the same or analogous features or elements of the present disclosure.

DETAILED DESCRIPTION

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, terms of approximation, such as "approximately," "substantially," and/or "about," refer to being within a ten percent (10%) margin of error of the stated value. As referenced herein, the terms "or" and "and/or" are generally intended to be inclusive (i.e., "A or B" is intended to mean "A or B or both"). As referred to herein, the terms "first," "second," and "third" can be used interchangeably to distinguish one component from another and are not intended to signify location or importance of the individual components.

As used herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling, etc.), mechanical coupling, operative coupling, optical coupling, and/or physical coupling. As referenced herein, the term "entity" refers to a human, a user, an end-user, a consumer, a computing device and/or program (e.g., a processor, computing hardware and/or software, an application, etc.), an agent, a machine learning (ML) and/or artificial intelligence (AI) algorithm, model, system, and/or application, and/or another type of entity that can implement one or more embodiments of the present disclosure as described herein, illustrated in the accompanying drawings, and/or included in the appended claims.

Example aspects of the present disclosure are directed to an appliance (e.g., a dishwasher appliance, a refrigerator appliance, an oven appliance, a microwave appliance, a washing machine appliance, or a dryer appliance, etc.). According to one or more example embodiments of the present disclosure, a dishwasher appliance can include a direct current (DC) load sensing system that can monitor, in real time, current flowing to one or more DC load components (e.g., fan, dispenser cup, buttons, etc.) coupled to the dishwasher appliance. The DC load sensing system can include software and hardware that can make decisions (e.g., related to configuration, operation, self-diagnostics, etc.) by detecting, identifying, monitoring, and/or diagnosing the one or more DC load components coupled to the dishwasher appliance.

The DC load sensing system according to example aspects of the present disclosure can include a high side current sensing circuit (e.g., a DC sensing circuit) that can be incorporated in line with a direct current rail (e.g., about a 13.5-volt rail) of a dishwasher appliance. In one embodiment, the current sensing circuit can include a shunt resistor that can be coupled to an amplifier (e.g., a differential and/or operational amplifier). In this embodiment, a voltage across the shunt resistor can change as a DC load turns on and off, and the voltage change can be amplified by the amplifier. In another embodiment, the current sensing circuit can include a Hall effect sensor that can detect the presence and/or magnitude of a magnetic field induced by the direct current of a DC load and can further output a signal having a voltage value corresponding to the magnetic field. In the above embodiments, a processor(s) (e.g., a microprocessor, a microcontroller, etc.) can read the signal output by either the amplifier or the Hall effect sensor and can further identify the DC load coupled to the dishwasher appliance. For example, in the above embodiments, the processor(s) can identify one or more attributes (e.g., a type, a feature, an operation mode, a configuration, a quantity, etc.) of the DC load based, at least in part, on the signal. For instance, according to multiple embodiments of the present disclosure, the processor(s) can identify: a fan type and/or speed; a dispenser cup type; a rinse aide type; respective types and/or quantities of one or more buttons and/or light sources (e.g., light emitting diodes (LEDs)) on a user interface of the dishwasher appliance; and/or another attribute of another DC load that can be coupled to the dishwasher.

In some embodiments, the processor(s) can determine whether a certain DC load (e.g., a dispenser cup, a rinse aide, etc.) is coupled to the dishwasher appliance based, at least in part, on the signal that can be output by the amplifier or the Hall effect sensor. In these embodiments, the processor(s) can further identify one or more of the above defined attributes of such a DC load based, at least in part, on the signal.

Aspects of the present disclosure can provide numerous technical effects and benefits. The DC load sensing system according to example embodiments of the present disclosure can be used to automatically (e.g., without direct input and/or selections from an entity implementing one or more embodiments described herein) detect, identify, monitor, and/or diagnose one or more DC load components associated with an appliance (e.g., coupled to and/or installed in a dishwasher appliance). Consequently, an advantage of the DC load sensing system according to example aspects of the present disclosure is that it can eliminate the storage of various personalities on memory associated with a controller of an appliance (e.g., eliminate the various personalities from user interface code stored in memory on a controller of a dishwasher appliance). Such elimination of the various personalities stored on the memory of the controller can free up a significant amount of memory and/or surface area on the controller, thereby enabling use of a smaller controller and/or reduced costs associated with manufacturing and/or operating the controller. Another advantage of the DC load sensing system according to example aspects of the present disclosure is that it can simplify the appliance design, manufacturing, assembly, and/or configuration process, as it can eliminate the manual selection of a certain personality corresponding to a particular model of the appliance as described above. Furthermore, as the DC load sensing system according to example aspects of the present disclosure can monitor one or more DC load components of an appliance in real time, yet another advantage of the system is that it can enable the appliance to perform a "self-diagnostics" process and further facilitate a performance feedback process with respect to the appliance, the one or more DC load components, and/or the behavior of an entity operating the appliance.

Figure 2:
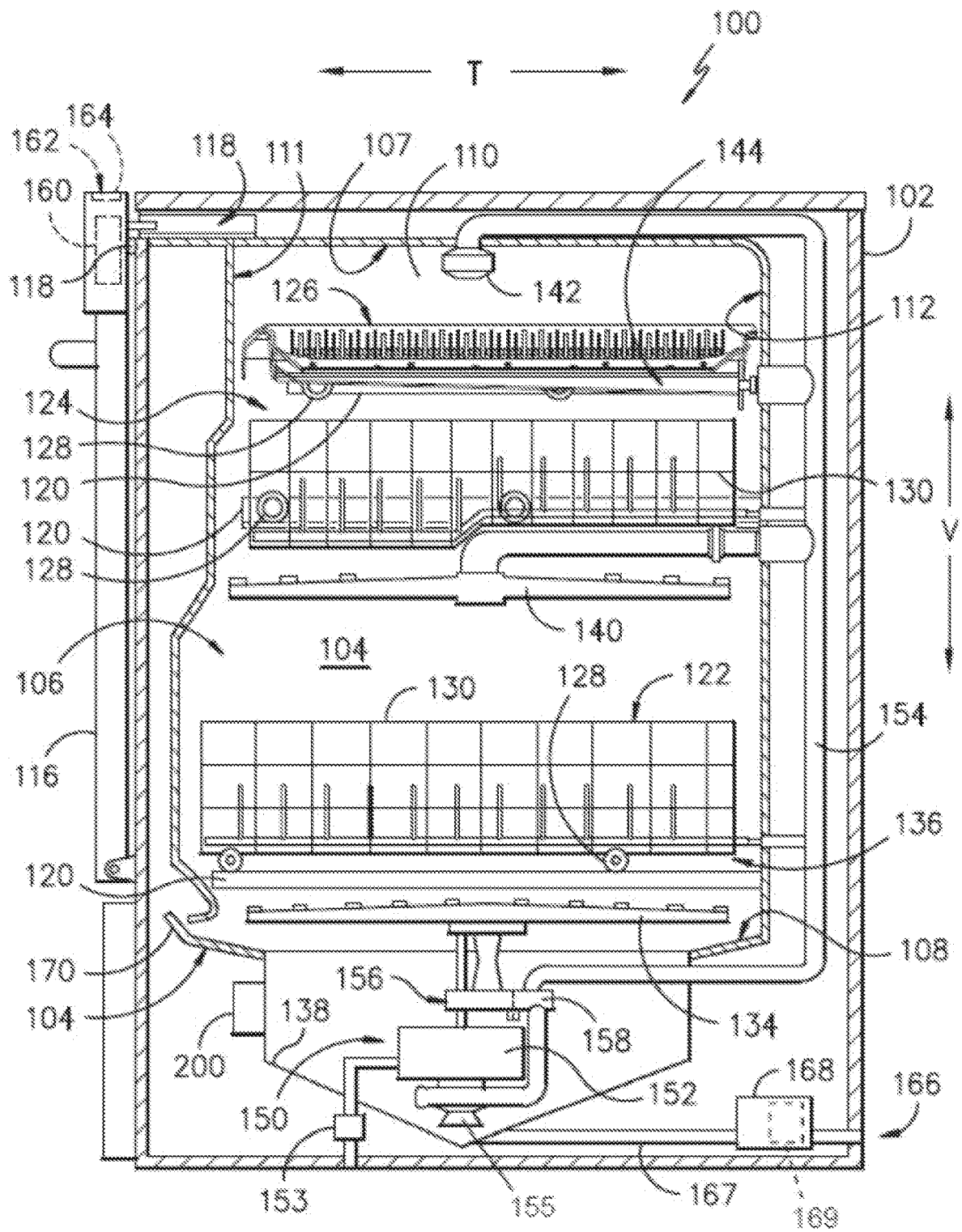
FIG. 2 illustrates a cross-sectional, side view of the example, non-limiting appliance of FIG. 1.

Turning now to the figures. FIGS. 1 and 2 each illustrate an example, non-limiting appliance that can be configured in accordance with one or more aspects of the present disclosure. Specifically, FIG. 1 illustrates a perspective view of an example, non-limiting appliance that can facilitate direct current load sensing in accordance with one or more embodiments of the present disclosure, and FIG. 2 illustrates a cross-sectional side view of the example, non-limiting appliance depicted in FIG. 1.

As illustrated in FIGS. 1 and 2, the example appliance can be provided as a dishwasher appliance 100. Although multiple embodiments, accompanying drawings, and/or appended claims of the present disclosure describe a dishwasher appliance, it should be appreciated that the present disclosure is not so limiting. For example, one or more other appliances can also be configured in accordance with one or more aspects of the present disclosure while remaining within the scope of the present subject matter. For instance, a refrigerator appliance, an oven appliance, a microwave appliance, a washing machine appliance, a dryer appliance, and/or another appliance can be configured in accordance with one or more aspects of the present disclosure while remaining within the scope of the present subject matter.

Generally, dishwasher appliance 100 can include a cabinet 102 that defines a vertical direction V, a lateral direction L, and a transverse direction T. Each of the vertical direction V, lateral direction L, and transverse direction T are mutually perpendicular to one another and form an orthogonal direction system.

Dishwasher appliance 100 can include a tub 104 that can be positioned within cabinet 102 to define a wash chamber 106. As shown, tub 104 can extend between a top 107 and a bottom 108 along the vertical direction V, between a pair of side walls 110 along the lateral direction L, and between a front side 111 and a rear side 112 along the transverse direction T.

Tub 104 can include a front opening 114. In some embodiments, a door 116 can be hinged at its bottom to move door 116 between a normally closed vertical position, where the wash chamber 106 can be sealed shut to complete a wash operation, and a horizontal open position to load and unload articles from dishwasher appliance 100. A door closure mechanism or assembly 118 can be provided to lock and unlock door 116 to enable accessing and sealing wash chamber 106.

In example embodiments, side walls 110 can accommodate a plurality of rack assemblies. For instance, guide rails 120 can be mounted to side walls 110 to support a lower rack assembly 122, a middle rack assembly 124, and/or an upper rack assembly 126. In some such embodiments, upper rack assembly 126 can be positioned at a top portion of wash chamber 106 above middle rack assembly 124, which can be positioned above lower rack assembly 122 along the vertical direction V.

Generally, lower rack assembly 122, middle rack assembly 124, and/or upper rack assembly 126 can be adapted to move between an extended loading position (not shown) in which the rack is substantially positioned outside of wash chamber 106, and a retracted position (shown in FIGS. 1 and 2) in which the rack is located inside of wash chamber 106. In some embodiments, movement can be facilitated, for instance, by rollers 128 that can be mounted onto lower rack assembly 122, middle rack assembly 124, and/or upper rack assembly 126, respectively.

Although guide rails 120 and rollers 128 are illustrated herein as facilitating movement of lower rack assembly 122, middle rack assembly 124, and/or upper rack assembly 126, respectively, it should be appreciated that any suitable sliding mechanism or member can be used according to alternative embodiments.

In optional embodiments, lower rack assembly 122, middle rack assembly 124, and/or upper rack assembly 126 can be fabricated into lattice structures that can include a plurality of wires or elongated members 130 (for clarity of illustration, only some elongated members 130 making up lower rack assembly 122, middle rack assembly 124, and/or upper rack assembly 126 are shown). In this regard, lower rack assembly 122, middle rack assembly 124, and/or upper rack assembly 126 can generally be configured to support articles within wash chamber 106 while allowing a flow of wash fluid to reach and impinge on those articles (e.g., during a cleaning or rinsing cycle). According to additional or alternative embodiments, a silverware basket (not shown) can be removably attached to a rack assembly (e.g., lower rack assembly 122), to facilitate placement of silverware, utensils, and the like, that are otherwise too small to be accommodated by the rack assembly.

Generally, dishwasher appliance 100 can include one or more spray assemblies to urge a flow of fluid (e.g., wash fluid) onto the articles placed within wash chamber 106.

In example embodiments, dishwasher appliance 100 can include a lower spray arm assembly 134 that can be disposed in a lower region 136 of wash chamber 106 and above a sump 138 such that it can rotate in relatively proximity to lower rack assembly 122.

In additional or alternative embodiments, a mid-level spray arm assembly 140 can be positioned in an upper region of wash chamber 106 (e.g., below and in close proximity to middle rack assembly 124). In this regard, mid-level spray arm assembly 140 can generally be configured to urge a flow of wash fluid up through middle rack assembly 124 and upper rack assembly 126.

In further additional or alternative embodiments, an upper spray assembly 142 can be located above upper rack assembly 126 along the vertical direction V. In this manner, upper spray assembly 142 can be generally configured to urge or cascade a flow of wash fluid downward over lower rack assembly 122, middle rack assembly 124, and/or upper rack assembly 126.

In yet further additional or alternative embodiments, upper rack assembly 126 can define an integral spray manifold 144. As illustrated in FIG. 2, integral spray manifold 144 can be directed upward, and thus generally configured to urge a flow of wash fluid substantially upward along the vertical direction V through upper rack assembly 126.

The various spray assemblies and manifolds described herein (e.g., lower spray arm assembly 134, mid-level spray arm assembly 140, upper spray assembly 142, integral spray manifold 144, etc.) can be components of a fluid distribution system or fluid circulation assembly 150 that can circulate wash fluid in tub 104. In certain embodiments, fluid circulation assembly 150 can include a circulation pump 152 to circulate wash fluid in tub 104. Circulation pump 152 can be located within sump 138 or within a machinery compartment located below sump 138 of tub 104. In certain embodiments, circulation pump 152 can include a dedicated circulation motor 155 that can be configured to selectively drive or motivate pump rotation, as is understood.

When assembled, circulation pump 152 can be in fluid communication with an external water supply line (not shown) and sump 138. A water inlet valve 153 can be positioned between such an external water supply line and circulation pump 152 (e.g., to selectively allow water to flow from the external water supply line to circulation pump 152). Additionally, or alternatively, water inlet valve 153 can be positioned between the external water supply line and sump 138 (e.g., to selectively allow water to flow from the external water supply line to sump 138). During use, water inlet valve 153 can be selectively controlled to open to allow the flow of water into dishwasher appliance 100 and can be selectively controlled to cease the flow of water into dishwasher appliance 100. Further, fluid circulation assembly 150 can include one or more fluid conduits or circulation piping for directing wash fluid from circulation pump 152 to the various spray assemblies and manifolds. In example embodiments, such as that shown in FIG. 2, a primary supply conduit 154 can extend from circulation pump 152, along rear side 112 of tub 104 along the vertical direction V to supply wash fluid throughout wash chamber 106. Optionally, circulation pump 152 or circulation motor 155 (e.g., presence, size, load capacity, type, etc.) can be dictated by or correspond to a certain model of a particular dishwasher appliance 100. Thus, different models of dishwasher appliance 100 can include different arrangements or configurations of circulation pump 152 or circulation motor 155.

In some embodiments, primary supply conduit 154 can be used to supply wash fluid to one or more spray assemblies (e.g., to mid-level spray arm assembly 140 or upper spray assembly 142). It should be appreciated, however, that according to alternative embodiments, any other suitable plumbing configuration can be used to supply wash fluid throughout the various spray manifolds and assemblies described herein. For instance, according to another example embodiment, primary supply conduit 154 can be used to provide wash fluid to mid-level spray arm assembly 140 and a dedicated secondary supply conduit (not shown) can be utilized to provide wash fluid to upper spray assembly 142. Other plumbing configurations can be used for providing wash fluid to the various spray devices and manifolds at any location within dishwasher appliance 100.

Lower spray arm assembly 134, mid-level spray arm assembly 140, upper spray assembly 142, integral spray manifold 144, and/or another spray device of dishwasher appliance 100 depicted in FIGS. 1 and 2 can include an arrangement of discharge ports or orifices that can direct wash fluid received from circulation pump 152 onto dishes or other articles located in wash chamber 106. The arrangement of the discharge ports, also referred to as jets, apertures, or orifices, can provide a rotational force by virtue of wash fluid flowing through the discharge ports. Alternatively, lower spray arm assembly 134, mid-level spray arm assembly 140, and/or upper spray assembly 142 can be motor-driven or can operate using any other suitable drive mechanism. Spray manifolds and assemblies may also be stationary. The resultant movement of lower spray arm assembly 134, mid-level spray arm assembly 140, and/or upper spray assembly 142 and the spray from fixed manifolds can provide coverage of dishes and other dishwasher contents with a washing spray. Other configurations of spray assemblies can be used as well. For instance, dishwasher appliance 100 can have additional spray assemblies to clean silverware, to scour casserole dishes, to spray pots and pans, to clean bottles, and/or to perform another spray or cleaning function. Optionally, the number and/or type of spray assemblies (e.g., lower spray arm assembly 134, mid-level spray arm assembly 140, and/or upper spray assembly 142) can be dictated by or correspond to a certain model of a particular dishwasher appliance 100. Thus, different models of dishwasher appliance 100 can include different arrangements and/or configurations of such spray assemblies.

In operation, circulation pump 152 can draw wash fluid in from sump 138 and can pump it to a diverter 156 (e.g., which can be positioned within sump 138 of dishwasher appliance 100). Diverter 156 can include a diverter disk (not shown) that can be disposed within a diverter chamber 158 to selectively distribute the wash fluid to the spray arm assemblies (e.g., lower spray arm assembly 134, mid-level spray arm assembly 140, and/or upper spray assembly 142) and/or other spray manifolds or devices (e.g., integral spray manifold 144). For example, the diverter disk may have a plurality of apertures that are configured to align with one or more outlet ports (not shown) at the top of diverter chamber 158. In this manner, the diverter disk can be selectively rotated to provide wash fluid to the desired spray device.

According to an example embodiment, diverter 156 can be configured to selectively distribute a flow of wash fluid from circulation pump 152 to various fluid supply conduits, only some of which are illustrated in FIG. 2 for clarity. For instance, diverter 156 can include four outlet ports (not shown) that can supply wash fluid to: a first conduit to rotate lower spray arm assembly 134 in the clockwise direction; a second conduit to rotate lower spray arm assembly 134 in the counterclockwise direction; a third conduit to spray an auxiliary rack such as a silverware rack; and a fourth conduit (e.g., primary supply conduit 154) to supply mid-level spray arm assembly 140 and/or upper spray assembly 142. Optionally, the presence or configuration (e.g., number or size of apertures) of diverter 156 can be dictated by or correspond to a certain model of a particular dishwasher appliance 100. Thus, different models of dishwasher appliance 100 can include different arrangements or configurations of one or more diverters 156.

Drainage of soiled wash fluid within sump 138 can occur, for example, through drain assembly 166. For instance, wash fluid can exit sump 138 through a drain (e.g., drain assembly 166 and/or a drain thereof) and can flow through a drain conduit 167. In certain embodiments, a drain pump 168 can facilitate drainage of the soiled wash fluid by pumping the wash fluid to a drain line external to dishwasher appliance 100. In optional embodiments, drain pump 168 can include a dedicated drain motor 169 configured to selectively drive or motivate pump rotation, as is understood. In alternative embodiments, however, drain pump 168 can share a common motor with, for instance, circulation pump 152. In these embodiments, the shared motor can selectively and/or alternately motivate either circulation pump 152 or drain pump 168. Optionally, drain pump 168 or drain motor 169 (e.g., presence, size, load capacity, type, etc.) can be dictated by or correspond to a certain model of a particular dishwasher appliance 100. Thus, different models of dishwasher appliance 100 can include different arrangements or configurations of drain pump 168 or drain motor 169.

In optional embodiments, one or more sensors 200 (e.g., condition sensor(s)) can be mounted within cabinet 102 to detect one or more corresponding conditions therein (e.g., during operation of dishwasher appliance 100). Such sensors 200 can include or be provided as any suitable electrically-readable sensing device that can be employed to detect temperature (e.g., thermistor or thermocouple), pressure (e.g., diaphragm sensor), or another relevant condition that can be used to direct operation of dishwasher appliance 100. Optionally, the presence or configuration (e.g., type, position, number, etc.) of sensors 200 can be dictated by or correspond to a certain model of a particular dishwasher appliance 100. Thus, different models of dishwasher appliance 100 can include different arrangements or configurations of sensors 200.

Dishwasher appliance 100 can be equipped with a controller 160 (also referred to as a "control board") that can direct and/or regulate operation of dishwasher appliance 100 and/or one or more components thereof. Controller 160 can include one or more memory devices and/or one or more processors. In some embodiments, controller 160 can include one or more memory devices that can include, but are not limited to: random-access memory (RAM) such as, for example, dynamic random-access memory (DRAM); read only memory (ROM) such as, for instance, flash memory; and/or another type of memory device. In some embodiments, controller 160 can include one or more microprocessors such as, for example, a general-purpose microprocessor or a special purpose microprocessor. In these embodiments, such a general-purpose microprocessor or special purpose microprocessor can be operable to execute programming instructions or micro-control code associated with a cleaning cycle, where such programming instructions and/or code can be stored on one or more of the memory devices that can be included on controller 160 as described above.

Generally, controller 160 can be coupled to and/or in communication (e.g., electrical, wired, and/or wireless communication) with various operational components of dishwasher appliance 100 (e.g., circulation motor 155, drain motor 169, water inlet valve 153, diverter 156, sensors 200, etc.). Controller 160 can be positioned in a variety of locations throughout dishwasher appliance 100. In the illustrated embodiment, for example, controller 160 is located within a control panel area of door 116 as shown in FIGS. 1 and 2. In this embodiment, input/output (I/O) signals can be routed between the controller 160 and one or more operational components of dishwasher appliance 100 along one or more wires (e.g., wiring harnesses) that can be routed, for instance, through the bottom of door 116.

Controller 160 can be coupled to and/or in electrical communication with a user interface 162. An entity operating dishwasher appliance 100 can employ user interface 162 to select various operational features and/or modes of dishwasher appliance 100, and/or to monitor progress of dishwasher appliance 100. User interface 162 generally can include multiple electric elements that can be selectively activated, directed, and/or driven by controller 160. In some embodiments, user interface 162 can include and/or be provided as a general purpose I/O (GPIO) device and/or functional block. In additional or alternative embodiments, user interface 162 can include one or more data input components, such as one or more of a variety of electrical, mechanical, and/or electro-mechanical input devices including, for instance, rotary dials, push buttons, and/or touch pads.

Separate from or in addition to the data input component(s), user interface 162 can include one or more display components 164 that can provide operational feedback to an entity operating dishwasher appliance 100. For instance, one or more display components 164 can include and/or be provided as a light source such as, for example, a light emitting diode (LED). User interface 162 and/or one or more display components 164 can be in communication with controller 160 via, for instance, one or more signal lines and/or shared communication busses. In some instances, the number of display components 164 (e.g., LEDs) can correspond to a certain model of dishwasher appliance 100. In other words, one model of dishwasher appliance 100 can include a higher number of display components 164 than another distinct model of dishwasher appliance 100.

It should be appreciated that the present subject matter is not limited to any particular style, model, and/or configuration of dishwasher appliance 100. The example embodiment depicted in FIGS. 1 and 2 is for illustrative purposes only. For example: different locations can be provided for user interface 162; different configurations can be provided for lower rack assembly 122, middle rack assembly 124, and/or upper rack assembly 126; different configurations can be used for the spray arm assemblies (e.g., lower spray arm assembly 134, mid-level spray arm assembly 140, and/or upper spray assembly 142) and/or spray manifold (e.g., integral spray manifold 144); different motor configurations can be used (e.g., for circulation pump 152 and/or drain pump 168); and/or other differences can be applied while remaining within the scope of the present subject matter.

Figure 3:
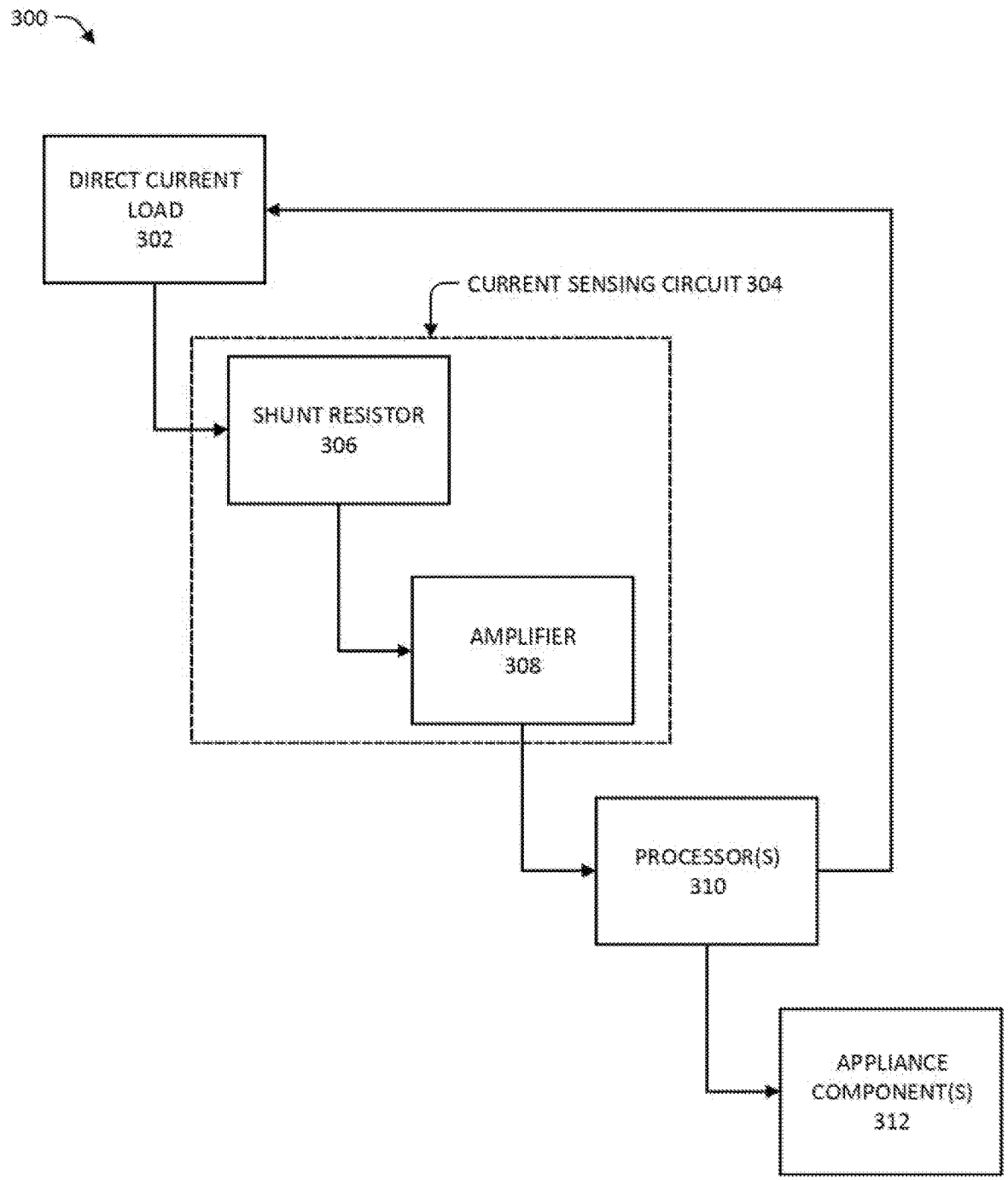
FIGS. 3 and 5 each illustrate a block diagram of an example, non-limiting circuit that can facilitate direct current load sensing in accordance with one or more embodiments of the present disclosure.

FIG. 3 illustrates a block diagram of an example, non-limiting circuit 300 that can facilitate DC load sensing in accordance with one or more embodiments of the present disclosure. For example, circuit 300 can be coupled to and/or provided in an appliance (e.g., dishwasher appliance 100, a refrigerator appliance, an oven appliance, a microwave appliance, a washing machine appliance, a dryer appliance, etc.) to facilitate DC load sensing (e.g., detection, identification, monitoring, diagnosis, etc.) of a DC load (e.g., a DC load component, a DC peripheral, a DC peripheral component, etc.) that can be coupled to and/or provided in the appliance. In one example embodiment and with reference to FIGS. 1 and 2 described above, circuit 300 can be coupled to and/or provided in dishwasher appliance 100 to facilitate DC load sensing of one or more DC load components (e.g., fan, dispenser cup, rinse aide, etc.), one or more display components 164 (e.g., light source (e.g., LED)), and/or one or more data input components of user interface 162 (e.g., rotary dial, push button, touch pad, etc.) that can be coupled to and/or provided in dishwasher appliance 100.

As illustrated in the example embodiment depicted in FIG. 3, circuit 300 can include a direct current load 302 (referred to herein as "DC load 302") that can be coupled to a current sensing circuit 304 (e.g., a DC sensing circuit). Examples of DC load 302 can include, but are not limited to, a DC peripheral or a DC peripheral component (e.g., a DC auxiliary component and/or device that can be coupled to and/or work with an appliance to which circuit 300 can be coupled and/or provided in), a fan, a dispenser cup, a rinse aide, a light source (e.g., an LED), a data input component (e.g., a button), and/or another DC load that can be coupled to and/or provided in an appliance.

In some embodiments, current sensing circuit 304 can be provided as a high side current sensing circuit that can be coupled to and/or provided in line with a DC power rail of an appliance. For example, current sensing circuit 304 can be provided as a high side DC sensing circuit that can be coupled to and/or provided in line with a DC rail (e.g., a 13.5-volt rail) of a dishwasher appliance (e.g., dishwasher appliance 100).

In the example embodiment depicted in FIG. 3, current sensing circuit 304 can include a shunt resistor 306 and/or an amplifier 308 (e.g., a differential amplifier and/or an operational amplifier). In this embodiment, DC load 302 can be coupled to shunt resistor 306 and shunt resistor 306 can be coupled to amplifier 308.

In multiple embodiments of the present disclosure, current sensing circuit 304 can be configured to collect electrical data corresponding to DC load 302, where such electrical data can include data indicative of a voltage drop across shunt resistor 306. For example, during operation, a voltage across shunt resistor 306 can change as DC load 302 turns on and off. In this example, the voltage change can be amplified by amplifier 308 and amplifier 308 can output a signal that can include the amplified voltage change value. As such, in this example, the signal that can be output by amplifier 308 can include and/or constitute the electrical data corresponding to DC load 302 that can be indicative of a voltage drop across shunt resistor 306. Other signals indicative of electrical data can be used without deviating from the scope of the present disclosure.

As illustrated in FIG. 3, circuit 300 can further include one or more processors 310 that can be coupled to current sensing circuit 304 and/or amplifier 308. In an example embodiment, one or more processors 310 can include, for instance, one or more microprocessors (e.g., one or more general-purpose microprocessors, one or more special purpose microprocessors, etc.). In various embodiments of the present disclosure, one or more processors 310 can be provided as one or more of the processors that can be included on controller 160 of dishwasher appliance 100 as described above with reference to FIGS. 1 and 2. In these embodiments, one or more processors 310 can have the same structure and/or functionality as that of such one or more processors that can be included on controller 160. In additional and/or alternative embodiments of the present disclosure, one or more processors 310 can perform one or more operations of such additional and/or alternative embodiments described herein. For example, one or more processors 310 can perform one or more of the methods (e.g., method 600, 700, 800, and/or 900) described below with reference to FIGS. 6, 7, 8, and/or 9.

As illustrated in FIG. 3, one or more processors 310 of circuit 300 can be coupled to DC load 302 and/or one or more appliance components 312. In multiple embodiments of the present disclosure, one or more appliance components 312 can include and/or be provided as one or more operational components of an appliance. For example, one or more appliance components 312 can be provided as one or more of the operational components of dishwasher appliance 100 (e.g., sump 138, circulation pump 152, water inlet valve 153, circulation motor 155, diverter 156, drain pump 168, drain motor 169, sensors 200, etc.) that can be coupled to and/or in communication with controller 160 as described above with reference to FIGS. 1 and 2. In these embodiments, one or more appliance components 312 can have the same structure and/or functionality as that of such one or more operational components of dishwasher appliance 100 that can be coupled to and/or in communication with controller 160. Moreover, in these embodiments, one or more processors 310 of circuit 300 can be coupled to a DC load component (e.g., DC load 302) and/or one or more appliance components (e.g., one or more appliance components 312) that can be coupled to and/or included in dishwasher appliance 100 via the one or more wires (e.g., wiring harnesses) that can be routed, for instance, through the bottom of door 116 of dishwasher appliance 100 as described above with reference to FIGS. 1 and 2.

In multiple embodiments of the present disclosure, one or more processors 310 can be configured to detect DC load 302 and/or identify at least one attribute of DC load 302 based, at least in part, on the above-described electrical data corresponding to DC load 302 that can be collected by current sensing circuit 304 (e.g., the data indicative of a voltage drop across shunt resistor 306 that can be included in the signal that can be output by amplifier 308). For example, one or more processors 310 can be configured to identify at least one attribute that can include, but is not limited to, a type (e.g., a fan type, a dispenser cup type, a rinse aid type, etc.), a feature, an operation mode (e.g., fan speed), a configuration, a quantity (e.g., a quantity of the data input component(s) and/or display components 164 that can be included on user interface 162 as described above such as, for instance, rotary dials, push buttons, touch pads, light sources (LEDs), etc.), and/or another attribute of DC load 302.

According to various embodiments of the present disclosure, one or more processors 310 can be configured to detect DC load 302 and/or identify the at least one attribute of DC load 302 based, at least in part, on the above-described electrical data corresponding to DC load 302 and a predefined dataset (e.g., a lookup table) that can include predefined electrical data corresponding to one or more predefined attributes of one or more predefined DC load components. For example, such a predefined dataset can include predefined electrical data in the form of, for instance, different predefined voltage values and/or current values that respectively correspond to different predefined attributes of different predefined types of DC load components. In this example, one or more processors 310 can reference the predefined dataset to match the electrical data corresponding to DC load 302 (e.g., a voltage value, current value, etc.) with predefined electrical data of the same form (e.g., a voltage value, current value, etc.) included in the predefined dataset. In this example, such predefined electrical data in the predefined dataset can correspond to one or more certain predefined attributes of one or more certain predefined DC load components included in the predefined dataset. In this example, by matching such electrical data corresponding to DC load 302 with such predefined electrical data included in the predefined dataset that corresponds to such one or more certain predefined attributes of such one or more certain predefined DC load components, one or more processors 310 can thereby detect DC load 302 and/or identify at least one attribute (e.g., type) of DC load 302.

In some embodiments, the above-described predefined dataset can be stored on a memory device that can be included in an appliance to which circuit 300 can be coupled and/or provided in. For example, the above-described predefined dataset can be stored on a memory device (e.g., RAM, DRAM, ROM, flash memory, etc.) that can be included on controller 160 of dishwasher appliance 100.

In some embodiments, one or more processors 310 can be further configured to activate at least one operation of DC load 302 and/or an appliance to which circuit 300 can be coupled and/or provided in based, at least in part, on identification of the at least one attribute of DC load 302. For example, based, at least in part, on identification of the at least one attribute of DC load 302, one or more processors 310 can be further configured to activate configuration of and/or configure DC load 302 and/or one or more appliance components 312 of an appliance (e.g., one or more processors 310 can be configured to define and/or activate an operation mode setting of DC load 302 and/or one or more appliance components 312). For instance, based, at least in part, on identification of the at least one attribute of DC load 302, one or more processors 310 can be further configured to activate configuration of and/or configure a DC load component and/or an operational component that can be coupled to and/or included in dishwasher appliance 100 (e.g., a fan, a dispenser cup, a rinse aide, a data input component (e.g., rotary dial, push button, touch pad, etc.), display component 164 (e.g., an LED), sump 138, circulation pump 152, water inlet valve 153, circulation motor 155, diverter 156, drain pump 168, drain motor 169, sensors 200, etc.).

In another example, based, at least in part, on identification of the at least one attribute of DC load 302, one or more processors 310 can be further configured to activate a power cycle (e.g., power on or off) and/or adjust an operation mode of DC load 302 and/or one or more appliance components 312 of an appliance. For instance, based, at least in part, on identification of the at least one attribute of DC load 302, one or more processors 310 can be further configured to activate a power cycle (e.g., power on or off) and/or adjust an operation mode of a DC load component and/or an operational component that can be coupled to and/or included in dishwasher appliance 100 (e.g., a fan, a dispenser cup, a rinse aide, a data input component (e.g., rotary dial, push button, touch pad, etc.), display component 164 (e.g., an LED), sump 138, circulation pump 152, water inlet valve 153, circulation motor 155, diverter 156, drain pump 168, drain motor 169, sensors 200, etc.).

In another example, based, at least in part, on identification of the at least one attribute of DC load 302, one or more processors 310 can be further configured to activate a diagnostics process corresponding to and/or diagnose DC load 302 and/or one or more appliance components 312 of an appliance. For instance, based, at least in part, on identification of the at least one attribute of DC load 302, one or more processors 310 can be further configured to activate a diagnostics process corresponding to and/or diagnose a DC load component and/or an operational component that can be coupled to and/or included in dishwasher appliance 100 (e.g., a fan, a dispenser cup, a rinse aide, a data input component (e.g., rotary dial, push button, touch pad, etc.), display component 164 (e.g., an LED), sump 138, circulation pump 152, water inlet valve 153, circulation motor 155, diverter 156, drain pump 168, drain motor 169, sensors 200, etc.).

Figure 4:
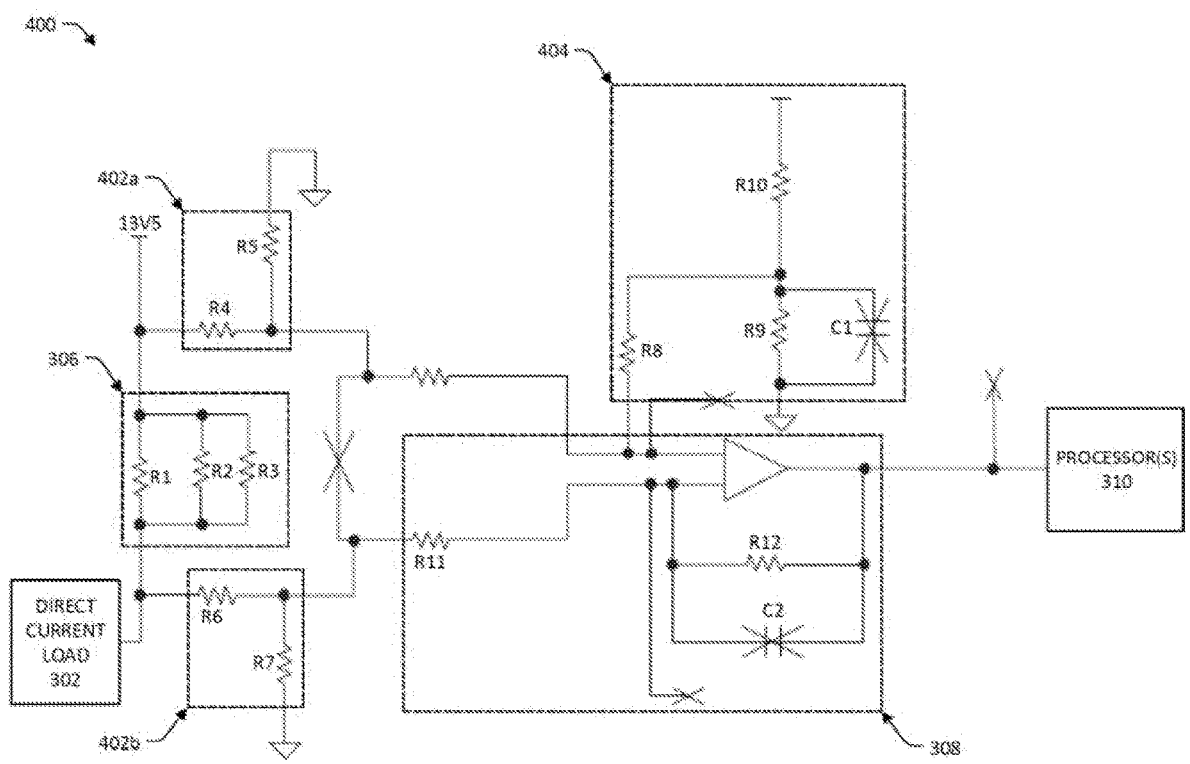
FIG. 4 illustrates a schematic diagram of an example, non-limiting current sensing circuit that can facilitate direct current load sensing in accordance with one or more embodiments of the present disclosure.

FIG. 4 illustrates a schematic diagram of an example, non-limiting current sensing circuit 400 that can facilitate direct current load sensing in accordance with one or more embodiments of the present disclosure. For example, current sensing circuit 400 can be coupled to and/or provided in an appliance (e.g., dishwasher appliance 100, a refrigerator appliance, an oven appliance, a microwave appliance, a washing machine appliance, a dryer appliance, etc.) to facilitate DC load sensing (e.g., detection, identification, monitoring, diagnosis, etc.) of a DC load (e.g., a DC peripheral component) that can be coupled to and/or provided in the appliance. In one example embodiment and with reference to FIGS. 1 and 2 described above, current sensing circuit 400 can be coupled to and/or provided in dishwasher appliance 100 to facilitate DC load sensing of one or more DC load components (e.g., fan, dispenser cup, rinse aide, etc.), one or more display components 164 (e.g., light source (e.g., LED)), and/or one or more data input components of user interface 162 (e.g., rotary dial, push button, touch pad, etc.) that can be coupled to and/or provided in dishwasher appliance 100.

As illustrated in the example embodiment depicted in FIG. 4, current sensing circuit 400 can be coupled to DC load 302 and/or one or more processors 310 described above with reference to FIG. 3. In the example embodiment illustrated in FIG. 4, current sensing circuit 400 can include and/or be provided as current sensing circuit 304 described above with reference to FIG. 3, where current sensing circuit 400 can include the same structure and/or functionality as that of current sensing circuit 304.

In some embodiments, shunt resistor 306 of current sensing circuit 400 can include the same structure and/or functionality as that of shunt resistor 306 that can be included in circuit 300 described above with reference to FIG. 3. In the example embodiment illustrated in FIG. 4, shunt resistor 306 can include and/or be provided as a high-side shunt resistor having one or more resistors. For instance, in this embodiment, shunt resistor 306 can include three resistors: resistor 1 (R1), resistor 2 (R2), and resistor 3 (R3). In this embodiment, such resistors can be coupled to one another in parallel and coupled to DC load 302 in series, where DC load 302 can be provided as an inductive DC load or a capacitive DC load.

Current sensing circuit 400 depicted in the example embodiment illustrated in FIG. 4 can further include a first subcircuit 402a and/or a second subcircuit 402b. In this embodiment, first subcircuit 402a and/or second subcircuit 402b can be coupled to one another in parallel and respectively coupled to DC load 302, shunt resistor 306, and/or amplifier 308 in series. In this embodiment, first subcircuit 402a and second subcircuit 402b can respectively include one or more resistors. For instance, in this embodiment, first subcircuit 402a can include resistor 4 (R4) and resistor 5 (R5), while second subcircuit 402b can include resistor 6 (R6) and resistor 7 (R7). In this embodiment, first subcircuit 402a and/or second subcircuit 402b can be included and/or provided in current sensing circuit 400 to facilitate clipping of an incoming signal to current sensing circuit 400 (e.g., clipping of an input signal from DC load 302).

Current sensing circuit 400 depicted in the example embodiment illustrated in FIG. 4 can further include a third subcircuit 404. As depicted in FIG. 4, in this embodiment, third subcircuit 404 can be coupled to first subcircuit 402a and/or amplifier 308. In this embodiment, third subcircuit 404 can include one or more resistors and/or a capacitor. For instance, in this embodiment, third subcircuit 404 can include resistor 8 (R8), resistor 9 (R9), and/or resistor 10 (R10), where such resistors can be coupled to one another in series. In this embodiment, third subcircuit 404 can further include capacitor 1 (C1) that can be coupled in parallel with resistor 9 (R9). In the example embodiment illustrated in FIG. 4, third subcircuit 404 can facilitate a unipolar signal split into a bipolar signal centered around a DC offset.

In some embodiments, amplifier 308 of current sensing circuit 400 can include the same structure and/or functionality as that of amplifier 308 that can be included in circuit 300 described above with reference to FIG. 3. In the example embodiment depicted in FIG. 4, amplifier 308 can include and/or be provided as an operational and/or differential amplifier that can include one or more resistors and/or a capacitor. For instance, in this embodiment, amplifier 308 can include resistor 11 (R11), resistor 12 (R12), and/or capacitor (C2). In this embodiment, amplifier 308 can facilitate amplification of a difference across shunt resistor 306 (e.g., a voltage drop across shunt resistor 306), where a gain associated with amplifier 308 can be set to monitor approximately 50 milliamps (mA) to approximately 1 amp (A).

As illustrated in the example embodiment depicted in FIG. 4, a signal that can be output by amplifier 308 of current sensing circuit 400 can be provided to one or more processors 310. As described above with reference to FIG. 3, based, at least in part, on such a signal that can be output by amplifier 308, one or more processors 310 can: identify at least one attribute of DC load 302; and/or activate at least one operation of DC load 302 and/or an appliance to which current sensing circuit 400 can be coupled and/or provided in.

Figure 5:
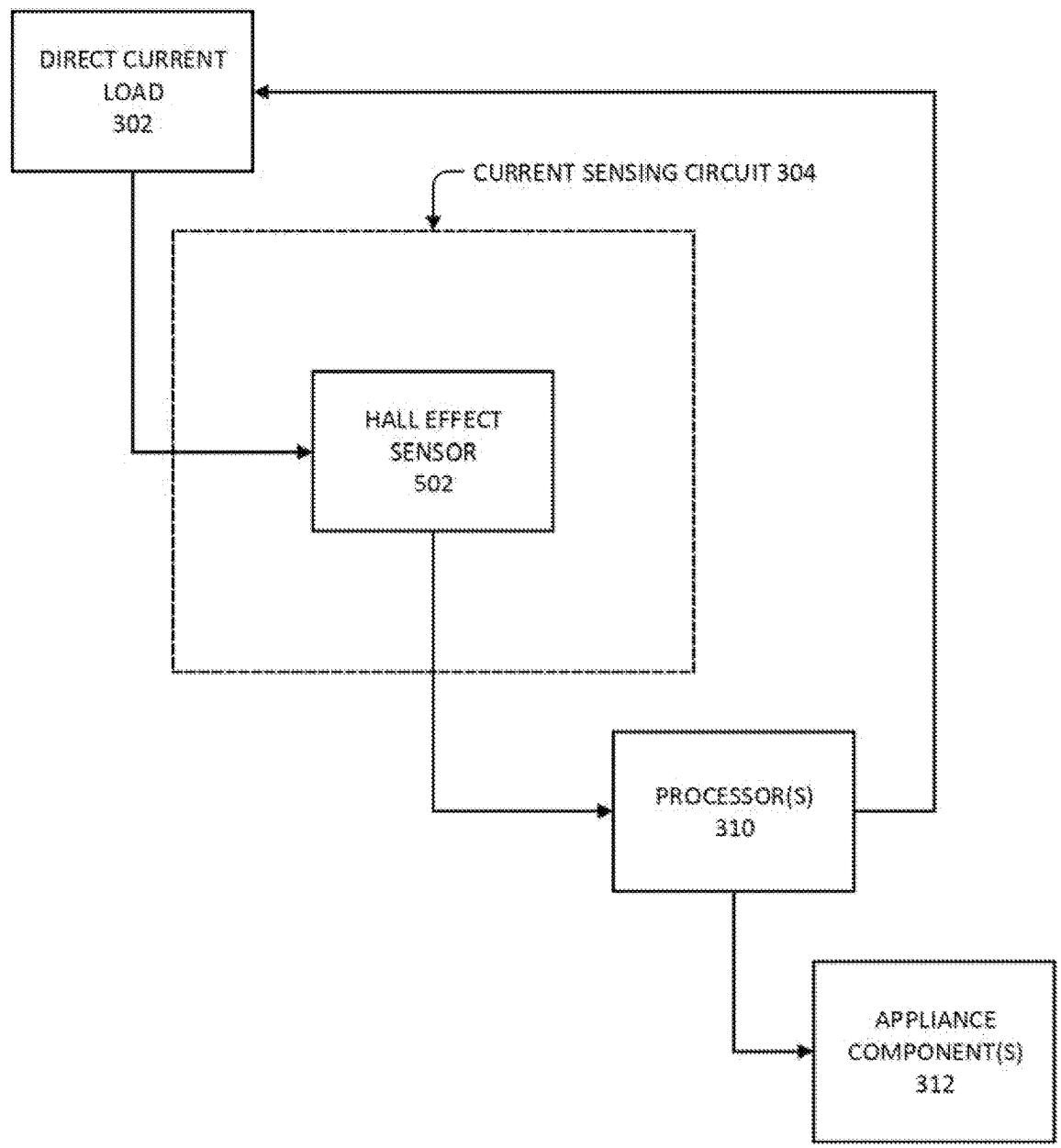

FIG. 5 illustrates a block diagram of an example, non-limiting circuit 500 that can facilitate DC load sensing in accordance with one or more embodiments of the present disclosure. For example, circuit 500 can be coupled to and/or provided in an appliance (e.g., dishwasher appliance 100, a refrigerator appliance, an oven appliance, a microwave appliance, a washing machine appliance, a dryer appliance, etc.) to facilitate DC load sensing (e.g., detection, identification, monitoring, diagnosis, etc.) of a DC load (e.g., a DC peripheral component) that can be coupled to and/or provided in the appliance. In one example embodiment and with reference to FIGS. 1 and 2 described above, circuit 500 can be coupled to and/or provided in dishwasher appliance 100 to facilitate DC load sensing of one or more DC load components (e.g., fan, dispenser cup, rinse aide, etc.), one or more display components 164 (e.g., light source (e.g., LED)), and/or one or more data input components of user interface 162 (e.g., rotary dial, push button, touch pad, etc.) that can be coupled to and/or provided in dishwasher appliance 100.

In an example aspect of the present disclosure, circuit 500 can be provided as an example, non-limiting alternative embodiment of circuit 300 described above with reference to FIG. 3. In the example embodiment illustrated in FIG. 5, current sensing circuit 304 of circuit 500 can include a Hall effect sensor 502 (e.g., in addition to or as an alternative to shunt resistor 306 and/or amplifier 308). As illustrated in the example embodiment depicted in FIG. 5, Hall effect sensor 502 can be coupled to DC load 302 and/or one or more processors 310.

In multiple embodiments of the present disclosure, current sensing circuit 304 of circuit 500 can be configured to collect electrical data corresponding to DC load 302, where such electrical data can include data indicative of an induced magnetic field. For example, during operation, Hall effect sensor 502 can detect the presence and/or magnitude of a magnetic field that can be induced by a direct current of DC load 302. In this example, Hall effect sensor 502 can further output a signal having a voltage value corresponding to the magnetic field. As such, in this example, the signal that can be output by Hall effect sensor 502 can include and/or constitute the electrical data corresponding to DC load 302 that can be indicative of an induced magnetic field.

In the example embodiment depicted in FIG. 5, one or more processors 310 of circuit 500 can be configured to detect DC load 302 and/or identify at least one attribute of DC load 302 based, at least in part, on the above-described electrical data corresponding to DC load 302 that can be collected by current sensing circuit 304 (e.g., the data indicative of a magnetic field that can be induced by DC load 302 and detected by Hall effect sensor 502). For example, based, at least in part, on such electrical data corresponding to DC load 302, one or more processors 310 of circuit 500 can be configured to detect DC load 302 and/or identify at least one attribute of DC load 302 in the same manner as that of one or more processors 310 of circuit 300 described above with reference to FIG. 3 (e.g., via the above-described predefined dataset (e.g., a lookup table)).

In the example embodiment illustrated in FIG. 5, one or more processors 310 of circuit 500 can be further configured to activate at least one operation of DC load 302 and/or an appliance to which circuit 500 can be coupled and/or provided in based, at least in part, on identification of the at least one attribute of DC load 302. For example, based, at least in part, on identification of the at least one attribute of DC load 302, one or more processors 310 of circuit 500 can be further configured to activate configuration of and/or configure DC load 302 and/or one or more appliance components 312 of an appliance in the same manner as that of one or more processors 310 of circuit 300 described above with reference to FIG. 3. In another example, based, at least in part, on identification of the at least one attribute of DC load 302, one or more processors 310 of circuit 500 can be further configured to activate a power cycle (e.g., power on or off) and/or adjust an operation mode of DC load 302 and/or one or more appliance components 312 of an appliance in the same manner as that of one or more processors 310 of circuit 300 described above with reference to FIG. 3. In another example, based, at least in part, on identification of the at least one attribute of DC load 302, one or more processors 310 of circuit 500 can be further configured to activate a diagnostics process corresponding to and/or diagnose DC load 302 and/or one or more appliance components 312 of an appliance in the same manner as that of one or more processors 310 of circuit 300 described above with reference to FIG. 3.

FIGS. 6-9 illustrate methods according to example embodiments of the present disclosure. FIGS. 6-9 depict operations performed in a particular order for purposes of illustration and discussion. Those of ordinary skill in the art, using the disclosures provided herein, will understand that any of the operations or functions of any of the methods provided herein can be adapted, rearranged, omitted, include operations not illustrated, expanded, and/or modified in various ways without deviating from the scope of the present disclosure.

Figure 6:
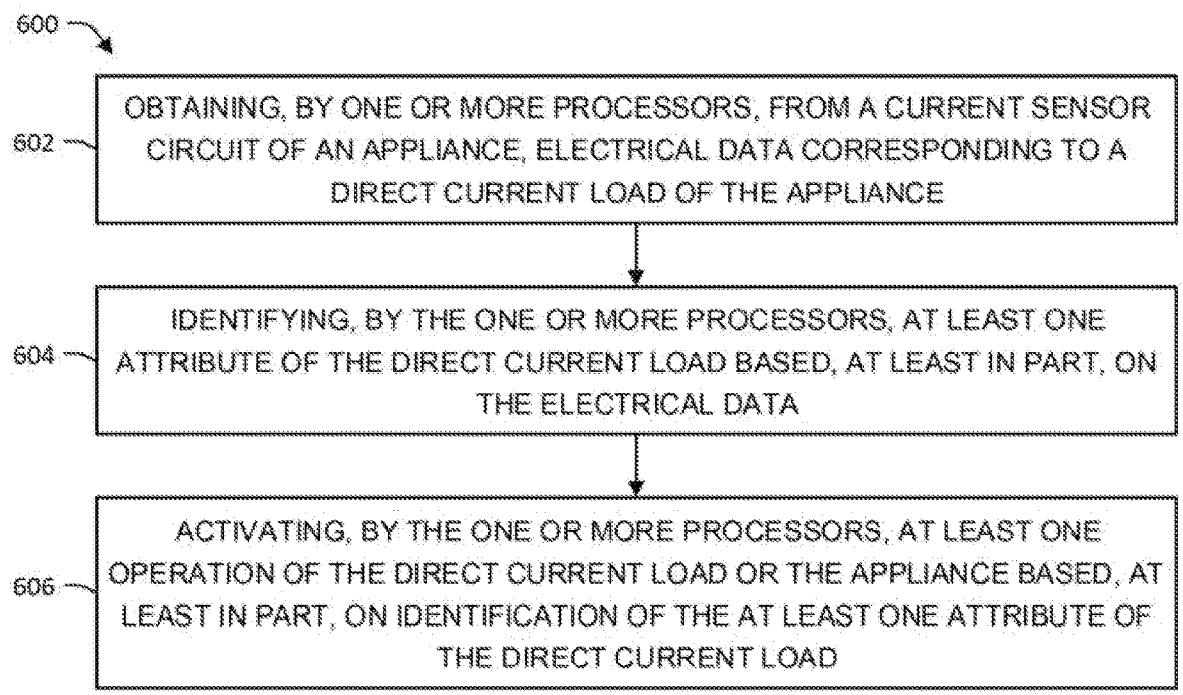
FIGS. 6, 7, 8, and 9 each illustrate a flow diagram of an example, non-limiting method that can be implemented to direct operation of an appliance in accordance with one or more embodiments of the present disclosure.

FIG. 6 illustrates a flow diagram of an example, non-limiting method 600 that can be implemented to direct operation of an appliance in accordance with one or more embodiments of the present disclosure. Method 600 can be used to operate any suitable appliance (e.g., dishwasher appliance, refrigerator appliance, oven appliance, microwave appliance, washing machine appliance, dryer appliance, etc.). As an example, some or all of method 600 can be used to operate dishwasher appliance 100 described above and illustrated in FIGS. 1 and 2, where controller 160 can include one or more processors 310 that can be programmed to implement some or all of method 600 (e.g., as or as part of an initial operation).

In the example embodiment illustrated in FIG. 6, at 602, method 600 can include obtaining, by one or more processors (e.g., one or more processors 310), from a current sensor circuit (e.g., current sensing circuit 304, current sensing circuit 400, etc.) of an appliance (e.g., dishwasher appliance 100), electrical data (e.g., electrical data indicative of a voltage drop across shunt resistor 306) corresponding to a direct current load (e.g., DC load 302) of the appliance.

In this example embodiment, at 604, method 600 can include identifying, by the one or more processors (e.g., as described above with reference to the example embodiment illustrated in FIG. 3), at least one attribute (e.g., type, feature, operation mode, configuration, quantity, etc.) of the direct current load based, at least in part, on the electrical data.

In this example embodiment, at 606, method 600 can include activating, by the one or more processors (e.g., as described above with reference to the example embodiment illustrated in FIG. 3), at least one operation (e.g., configuration, power on or off, adjust operation mode, diagnostics, etc.) of the direct current load or the appliance based, at least in part, on identification of the at least one attribute of the direct current load.

Figure 7:
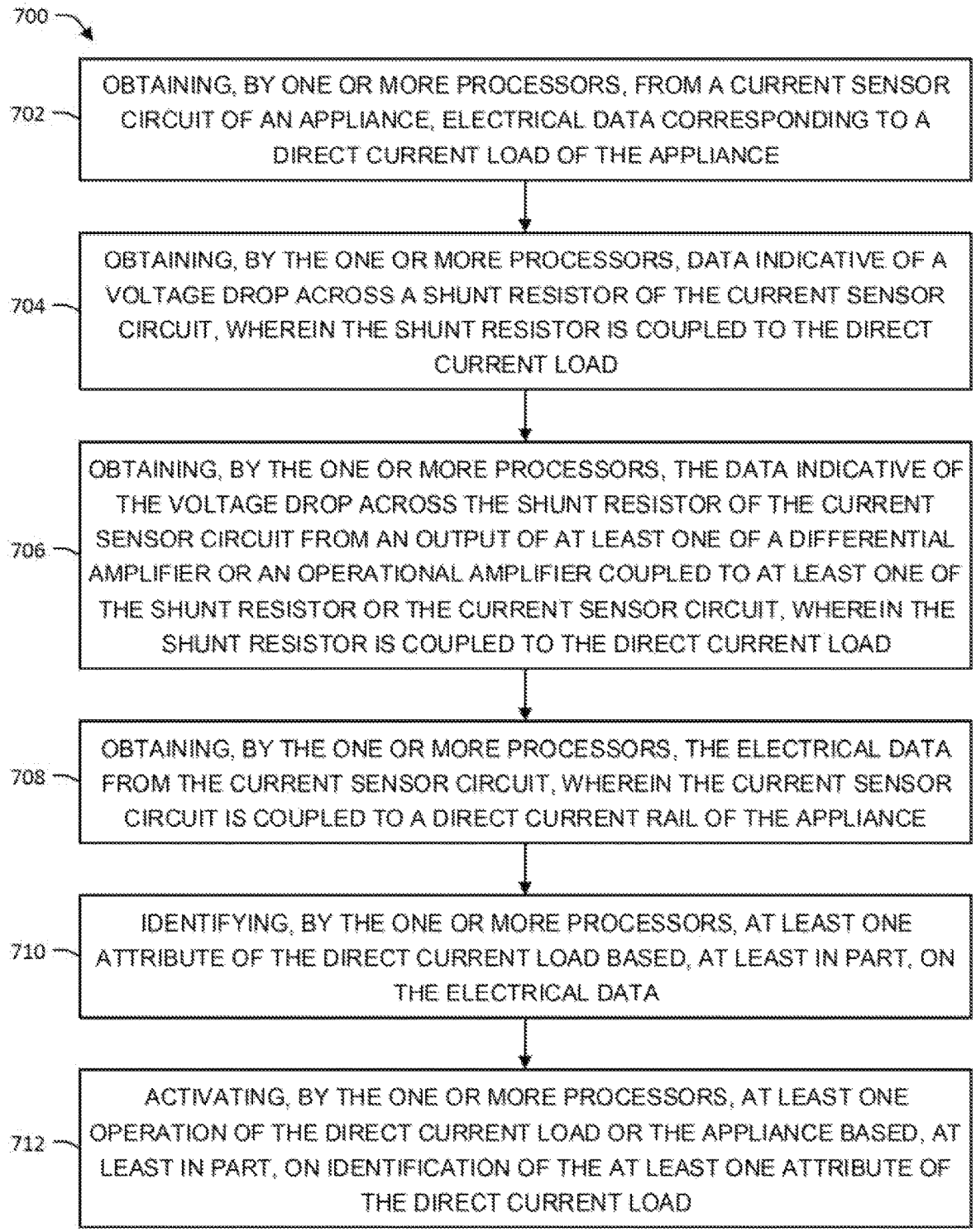

FIG. 7 illustrates a flow diagram of an example, non-limiting method 700 that can be implemented to direct operation of an appliance in accordance with one or more embodiments of the present disclosure. Method 700 can be used to operate any suitable appliance (e.g., dishwasher appliance, refrigerator appliance, oven appliance, microwave appliance, washing machine appliance, dryer appliance, etc.). As an example, some or all of method 700 can be used to operate dishwasher appliance 100 described above and illustrated in FIGS. 1 and 2, where controller 160 can include one or more processors 310 that can be programmed to implement some or all of method 700 (e.g., as or as part of an initial operation).

In the example embodiment illustrated in FIG. 7, at 702, method 700 can include obtaining, by one or more processors (e.g., one or more processors 310), from a current sensor circuit (e.g., current sensing circuit 304, current sensing circuit 400, etc.) of an appliance (e.g., dishwasher appliance 100), electrical data (e.g., electrical data indicative of a voltage drop across shunt resistor 306) corresponding to a direct current load (e.g., DC load 302) of the appliance.

In this example embodiment, at 704, method 700 can include obtaining, by the one or more processors (e.g., from amplifier 308), data indicative of a voltage drop across a shunt resistor (e.g., shunt resistor 306) of the current sensor circuit, where the shunt resistor is coupled to the direct current load.

In this example embodiment, at 706, method 700 can include obtaining, by the one or more processors, the data indicative of the voltage drop across the shunt resistor of the current sensor circuit from an output of at least one of a differential amplifier or an operational amplifier (e.g., amplifier 308 of current sensing circuit 304 or current sensing circuit 400) coupled to at least one of the shunt resistor or the current sensor circuit, where the shunt resistor is coupled to the direct current load.

In this example embodiment, at 708, method 700 can include obtaining, by the one or more processors, the electrical data from the current sensor circuit, where the current sensor circuit is coupled to a direct current rail of the appliance (e.g., a 13.5-volt rail of dishwasher appliance 100).

In this example embodiment, at 710, method 700 can include identifying, by the one or more processors, at least one attribute (e.g., type, feature, operation mode, configuration, quantity, etc.) of the direct current load based, at least in part, on the electrical data.

In this example embodiment, at 712, method 600 can include activating, by the one or more processors, at least one operation (e.g., configuration, power on or off, adjust operation mode, diagnostics, etc.) of the direct current load or the appliance based, at least in part, on identification of the at least one attribute of the direct current load.

Figure 8:
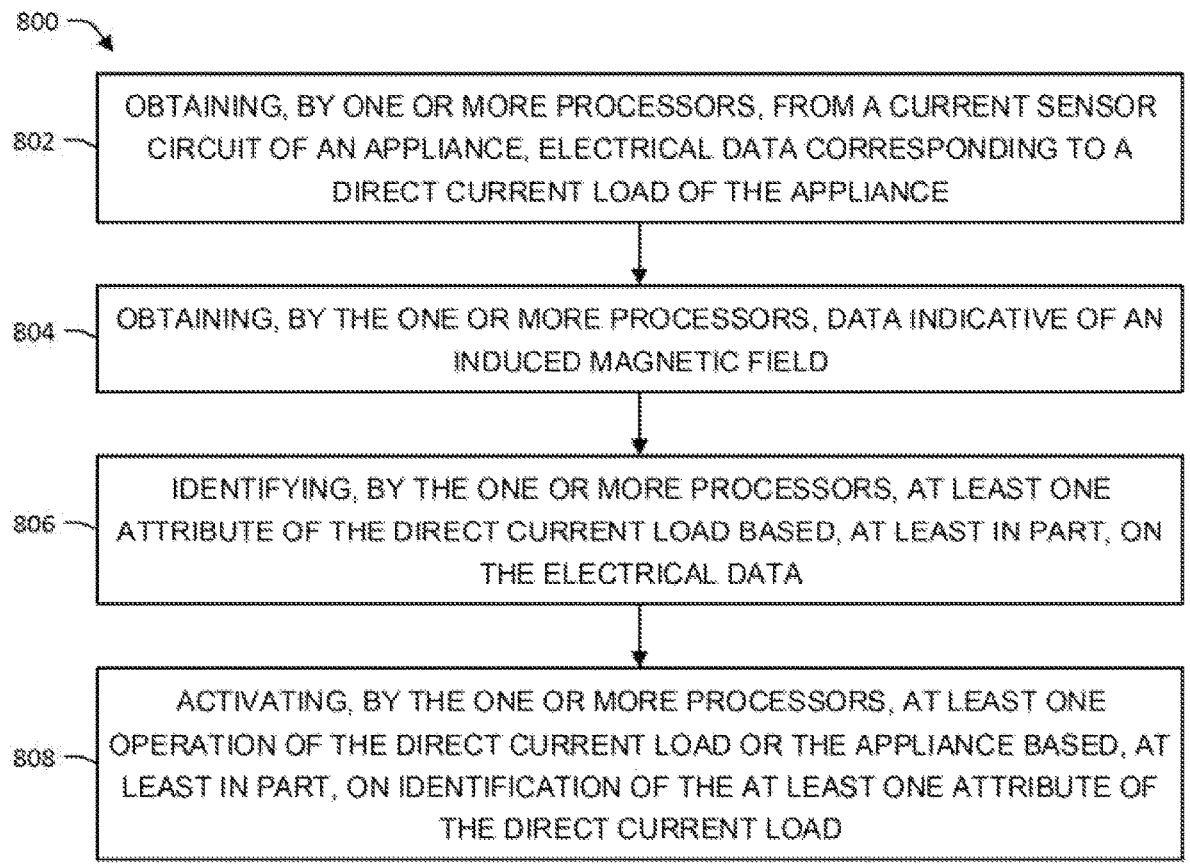

FIG. 8 illustrates a flow diagram of an example, non-limiting method 800 that can be implemented to direct operation of an appliance in accordance with one or more embodiments of the present disclosure. Method 800 can be used to operate any suitable appliance (e.g., dishwasher appliance, refrigerator appliance, oven appliance, microwave appliance, washing machine appliance, dryer appliance, etc.). As an example, some or all of method 800 can be used to operate dishwasher appliance 100 described above and illustrated in FIGS. 1 and 2, where controller 160 can include one or more processors 310 that can be programmed to implement some or all of method 800 (e.g., as or as part of an initial operation).

In the example embodiment illustrated in FIG. 8, at 802, method 800 can include obtaining, by one or more processors (e.g., one or more processors 310), from a current sensor circuit (e.g., current sensing circuit 304 including Hall effect sensor 502) of an appliance (e.g., dishwasher appliance 100), electrical data corresponding to a direct current load (e.g., DC load 302) of the appliance.

In this example embodiment, at 804, method 800 can include obtaining, by the one or more processors (e.g., from Hall effect sensor 502), data indicative of an induced magnetic field (e.g., electrical data indicative of a magnetic field that can be induced by DC load 302 during operation of the example embodiment (e.g., circuit 500) described above and illustrated in FIG. 5).

In this example embodiment, at 806, method 800 can include identifying, by the one or more processors (e.g., as described above with reference to the example embodiment illustrated in FIG. 3), at least one attribute (e.g., type, feature, operation mode, configuration, quantity, etc.) of the direct current load based, at least in part, on the electrical data.

In this example embodiment, at 808, method 800 can include activating, by the one or more processors (e.g., as described above with reference to the example embodiment illustrated in FIG. 3), at least one operation (e.g., configuration, power on or off, adjust operation mode, diagnostics, etc.) of the direct current load or the appliance based, at least in part, on identification of the at least one attribute of the direct current load.

Figure 9:
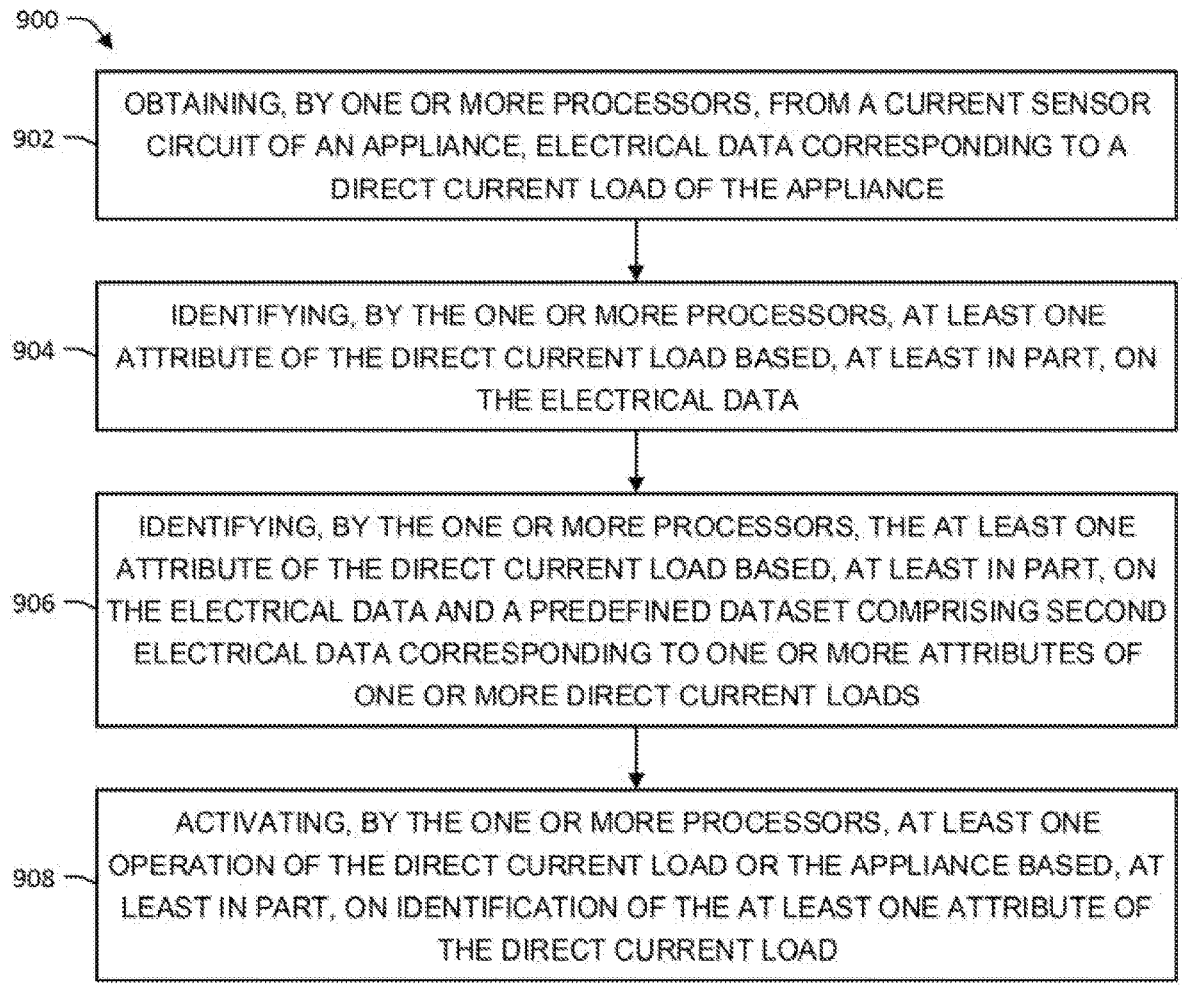

FIG. 9 illustrates a flow diagram of an example, non-limiting method 900 that can be implemented to direct operation of an appliance in accordance with one or more embodiments of the present disclosure. Method 900 can be used to operate any suitable appliance (e.g., dishwasher appliance, refrigerator appliance, oven appliance, microwave appliance, washing machine appliance, dryer appliance, etc.). As an example, some or all of method 900 can be used to operate dishwasher appliance 100 described above and illustrated in FIGS. 1 and 2, where controller 160 can include one or more processors 310 that can be programmed to implement some or all of method 900 (e.g., as or as part of an initial operation).

In the example embodiment illustrated in FIG. 9, at 902, method 900 can include obtaining, by one or more processors (e.g., one or more processors 310), from a current sensor circuit (e.g., current sensing circuit 304, current sensing circuit 400, etc.) of an appliance (e.g., dishwasher appliance 100), electrical data (e.g., electrical data indicative of a voltage drop across shunt resistor 306) corresponding to a direct current load (e.g., DC load 302) of the appliance.

In this example embodiment, at 904, method 900 can include identifying, by the one or more processors (e.g., as described above with reference to the example embodiment illustrated in FIG. 3), at least one attribute (e.g., type, feature, operation mode, configuration, quantity, etc.) of the direct current load based, at least in part, on the electrical data.

In this example embodiment, at 906, method 900 can include identifying, by the one or more processors (e.g., as described above with reference to the example embodiment illustrated in FIG. 3), the at least one attribute of the direct current load based, at least in part, on the electrical data and a predefined dataset (e.g., a lookup table) comprising second electrical data (e.g., predefined voltage and/or current values) corresponding to one or more attributes (e.g., one or more predefined attributes) of one or more direct current loads (e.g., one or more predefined DC load components included in the predefined dataset).

In this example embodiment, at 908, method 900 can include activating, by the one or more processors (e.g., as described above with reference to the example embodiment illustrated in FIG. 3), at least one operation (e.g., configuration, power on or off, adjust operation mode, diagnostics, etc.) of the direct current load or the appliance based, at least in part, on identification of the at least one attribute of the direct current load.

This written description uses examples to disclose the present disclosure, including the best mode, and also to enable any person skilled in the art to practice the present disclosure, including making and/or using any devices and/or systems and/or performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance comprising:
a direct current load;
a current sensing circuit coupled to the direct current load and configured to collect electrical data corresponding to the direct current load, wherein the current sensing circuit comprises a first subcircuit and a second subcircuit coupled in parallel, the first subcircuit comprises one or more resistors, the second subcircuit comprises one or more resistors, the first subcircuit and the second subcircuit further coupled to a shunt resistor coupled to and the direct current load, an amplifier coupled between the shunt resistor and one or more processors, the amplifier comprises one or more resistors and a capacitor and coupled to a third subcircuit, the third subcircuit comprises one or more resistor and a capacitor, wherein the electrical data comprises data indicative of an induced magnetic field; and
the one or more processors configured to:
identify at least one attribute of the direct current load based, at least in part, on the electrical data; and
activate at least one operation of the direct current load or the appliance based, at least in part, on identification of the at least one attribute of the direct current load.
wherein the electrical data comprises data indicative of the induced magnetic field.

2. The appliance of claim 1, wherein the at least one attribute of the direct current load comprises at least one of: a type, a feature, an operation mode, a configuration, or a quantity.

3. The appliance of claim 1, wherein the electrical data comprises data indicative of a voltage drop across the shunt resistor of the current sensing circuit, and wherein the shunt resistor is coupled to the direct current load.

4. The appliance of claim 1, wherein the current sensing circuit is coupled to a direct current rail of the appliance.

5. The appliance of claim 1, wherein the appliance comprises a dishwasher appliance, a refrigerator appliance, an oven appliance, a microwave appliance, a washing machine appliance, or a dryer appliance.

6. The appliance of claim 1, wherein the direct current load comprises one or more direct current peripheral components, a fan, a dispenser cup, a rinse aide, one or more light sources, or one or more data input components.

7. The appliance of claim 1, wherein the one or more processors are further configured to identify the at least one attribute of the direct current load based, at least in part, on the electrical data and a predefined dataset comprising second electrical data corresponding to one or more attributes of one or more direct current loads.

8. A method of operating an appliance comprising:
obtaining, by one or more processors, from a current sensing circuit of the appliance, electrical data corresponding to a direct current load of the appliance, wherein the electrical data comprises electrical data indicative of a voltage drop across a shunt resistor of the current sensing circuit, wherein the current sensing circuit comprises a first subcircuit and a second subcircuit coupled in parallel, the first subcircuit comprises one or more resistors, the second subcircuit comprises one or more resistors, the first subcircuit and the second subcircuit further coupled to the shunt resistor to and the direct current load, an amplifier coupled between the shunt resistor and one or more processors, the amplifier comprises one or more resistors and a capacitor and coupled to a third subcircuit, the third subcircuit comprises one or more resistor and a capacitor;
identifying, by the one or more processors, at least one attribute of the direct current load based, at least in part, on the electrical data; and
activating, by the one or more processors, at least one operation of the direct current load or the appliance based, at least in part, on identification of the at least one attribute of the direct current load.

9. The method of claim 8, wherein the at least one attribute of the direct current load comprises at least one of: a type, a feature, an operation mode, a configuration, or a quantity.

10. The method of claim 8, wherein obtaining, by the one or more processors, from the current sensing circuit of the appliance, the electrical data corresponding to the direct current load of the appliance comprises:
obtaining, by the one or more processors, data indicative of a voltage drop across the shunt resistor of the current sensing circuit from an output of the amplifier coupled to at least one of the shunt resistor or the current sensing circuit, and wherein the shunt resistor is coupled to the direct current load.

11. The method of claim 8, wherein obtaining, by the one or more processors, from the current sensing circuit of the appliance, the electrical data corresponding to the direct current load of the appliance comprises:
obtaining, by the one or more processors, data indicative of an induced magnetic field.

12. The method of claim 8, wherein obtaining, by the one or more processors, from the current sensing circuit of the appliance, the electrical data corresponding to the direct current load of the appliance comprises:
obtaining, by the one or more processors, the electrical data from the current sensing circuit, and wherein the current sensing circuit is coupled to a direct current rail of the appliance.

13. The method of claim 8, wherein the appliance comprises a dishwasher appliance, a refrigerator appliance, an oven appliance, a microwave appliance, a washing machine appliance, or a dryer appliance, and wherein the direct current load comprises one or more direct current peripheral components, a fan, a dispenser cup, a rinse aide, one or more light sources, or one or more data input components.

14. The method of claim 8, wherein identifying, by the one or more processors, the at least one attribute of the direct current load based, at least in part, on the electrical data comprises:
identifying, by the one or more processors, the at least one attribute of the direct current load based, at least in part, on the electrical data and a predefined dataset comprising second electrical data corresponding to one or more attributes of one or more direct current loads.

15. A dishwasher appliance comprising:
a direct current peripheral;
a current sensing circuit coupled to the direct current peripheral and configured to collect electrical data corresponding to the direct current peripheral, wherein the current sensing circuit comprises a first subcircuit and a second subcircuit coupled in parallel, the first subcircuit comprises one or more resistors, the second subcircuit comprises one or more resistors, the first subcircuit and the second subcircuit further coupled to a shunt resistor and the direct current load, an amplifier coupled between to the shunt resistor and one or more processors, the amplifier comprises one or more resistors and a capacitor and coupled to a third subcircuit, the third subcircuit comprises one or more resistor and a capacitor, wherein the electrical data comprises data indicative of an induced magnetic field; and the one or more processors configured to:
identify at least one attribute of the direct current peripheral based, at least in part, on the electrical data; and activate at least one operation of the direct current peripheral or the dishwasher appliance based, at least in part, on identification of the at least one attribute of the direct current peripheral.

\* \* \* \* \*